United States Patent
Lee et al.

(10) Patent No.: US 7,929,564 B2
(45) Date of Patent: Apr. 19, 2011

(54) SYSTEM, APPARATUS, AND METHOD FOR LOADING BITS INTO SUB-CHANNELS

(75) Inventors: Ta-Sung Lee, Hsinchu (TW);
Ching-Wen Hsiao, Banciao (TW)

(73) Assignee: Mediatek Inc., Hsinchu (TW)

(*) Notice: Subject to any disclaimer, the term of this patent is extended or adjusted under 35 U.S.C. 154(b) by 322 days.

(21) Appl. No.: 12/048,339

(22) Filed: Mar. 14, 2008

(65) Prior Publication Data
US 2009/0232156 A1    Sep. 17, 2009

(51) Int. Cl.
*H04J 3/16* (2006.01)
(52) U.S. Cl. .......... 370/437; 370/465; 370/472
(58) Field of Classification Search ............ 370/204, 370/252, 254, 255, 431, 437, 464, 465, 472
See application file for complete search history.

(56) References Cited

U.S. PATENT DOCUMENTS
4,744,095 A * 5/1988 Cornet et al. ............. 375/347
5,521,906 A * 5/1996 Grube et al. ............. 370/252
* cited by examiner Primary Examiner — Seema S Rao
Assistant Examiner — Mon Cheri S Davenport
(74) Attorney, Agent, or Firm — Thomas, Kayden, Horstemeyer & Risley, LLP

(57) ABSTRACT

An apparatus and a method for loading a predetermined number of bits into a plurality of sub-channels are provided. The apparatus comprises a sort module, a calculation module, and a decision module. The sort module is configured to sort the sub-channels into a plurality of sorted sub-channels according to the quality value of each of the sub-channels. The calculation module is configured to calculate the difference value for each of the sorted sub-channels, except for the first sorted sub-channel, according to the corresponding quality value. The decision module is configured to decide a number of bits for each of the sorted sub-channels according to the difference values, wherein a summation of the numbers is equal to the predetermined number. The apparatus and the method are able to load bits efficiently according to the difference values.

20 Claims, 6 Drawing Sheets

SYSTEM, APPARATUS, AND METHOD FOR LOADING BITS INTO SUB-CHANNELS

CROSS-REFERENCES TO RELATED APPLICATIONS

Not applicable.

BACKGROUND OF THE INVENTION

1. Field of the Invention

The present invention relates to a system, an apparatus, and a method for loading bits into sub-channels. More particularly, the present invention relates to a system, an apparatus, and a method for loading bits into sub-channels according to the different sub-channel qualities.

2. Descriptions of the Related Art

Currently, most digital communication systems, such as orthogonal frequency division multiplexing (OFDM) and asymmetric digital subscriber line (ADSL), employ multi-channel or multi-carrier transmission. It is quite important in the field of multi-channel transmission to be effectively allocating bits into sub-channels so that the performance is able to be increased and the bit error rate (BER) during the transmission is able to be reduced.

Power and data rate are involved in a bit loading method, which allocates bits and power to sub-channels. Conventionally, the bit loading methods are either subject to a fixed power or a fixed data rate. When a bit loading method is subject to a fixed power, the method intends to maximize the data rate under the fixed power. When a bit loading method is subject to a fixed data rate, the method intends to minimize the power.

In U.S. Pat. No. 6,418,161, a bit loading method subject to a fixed power is provided, wherein the power is limited by a power spectral-density mask and an aggregate signal power constraint. The method allocates bits to sub-channels according to the lowest marginal power-cost per bit. If there is remaining aggregate signal power after all the bits have been allocated to the sub-channels with sufficient margins to carry a bit, additional bits are assigned to the sub-channels using frequency-domain-spreading across several sub-channels at the corresponding reduced power levels. Although optimal, this method is too complicated for initial bit allocation.

On the contrary, the bit-filling method and the bit-removal method are subject to a fixed data rate. Both of them allocate or remove bits iteratively based on the power cost of sub-channels. The bit-filling method initially allocates zero bits to all sub-channels and then adds one bit at a time to the sub-channel that requires minimum additional power until the target data rate is achieved. The bit-removal method initially allocates maximal bits to the sub-channels and then removes one bit at a time from the sub-channel that reduces the maximum power until the target data rate is achieved. Both the bit-filling and bit-removal methods result in the same bit allocation. Although both methods can achieve optimal results, they are complicated and inefficient due to the bit-based iteration.

Although optimal bit loading methods have been proposed in this field, all of them are extremely complicated. Thus, an efficient approach for allocating bits to sub-channels is still needed in this field.

SUMMARY OF THE INVENTION

An objective of the present invention is to provide a system. The system comprises a processing unit and an interface. The processing unit is configured to load a predetermined number of bits into a plurality of sub-channels. The processing unit comprises a sort module, a calculation module, and a decision module. The sort module is configured to sort the sub-channels into a plurality of sorted sub-channels according to a quality value of each of the sub-channels. The calculation module is configured to calculate a difference value for each of the sorted sub-channels, except for the first sorted sub-channel, according to the corresponding quality value. The decision module is configured to decide a number of bits for each of the sorted sub-channels according to the difference values, wherein a summation of the numbers is equal to the predetermined number. The interface is configured to transmit the predetermined number of bits.

Another objective of the present invention is to provide an apparatus for loading a predetermined number of bits into a plurality of sub-channels. The apparatus comprises a sort module, a calculation module, and a decision module. The sort module is configured to sort the sub-channels into a plurality of sorted sub-channels according to a quality value of each of the sub-channels. The calculation module is configured to calculate a difference value for each of the sorted sub-channels, except for the first sorted sub-channel, according to the corresponding quality values. The decision module is configured to decide a number of bits for each of the sorted sub-channels according to the difference values, wherein a summation of the numbers is equal to the predetermined number.

A further objective of the present invention is to provide an apparatus for loading a predetermined number of bits into a plurality of sub-channels. The apparatus comprises (1) means for sorting the sub-channels into a plurality of sorted sub-channels according to a quality value of each of the sub-channels, (2) means for calculating a difference value for each of the sorted sub-channels, except for the first sorted sub-channel, according to the corresponding quality values, and (3) means for deciding a number of bits for each of the sorted sub-channels according to the difference values, wherein a summation of the numbers is equal to the predetermined number.

Yet a further objective of the present invention is to provide a method for loading a predetermined number of bits to a plurality of sub-channels. The method comprises the following steps: (1) sorting the sub-channels into a plurality of sorted sub-channels according to a quality value of each of the sub-channels, (2) calculating a difference value for each of the sorted sub-channels, except for the first sorted sub-channel, according to the corresponding quality values, and (3) deciding a number of bits for each of the sorted sub-channels according to the difference values, wherein a summation of the numbers is equal to the predetermined number.

According to the aforementioned arrangements and steps, the present invention is able to exploit the differences of the channel qualities between sub-channels and then load bits into the sub-channels based on the differences. Using these differences, more than one bit can be loaded per iteration. Consequently, the present invention can load bits into sub-channels more efficiently.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
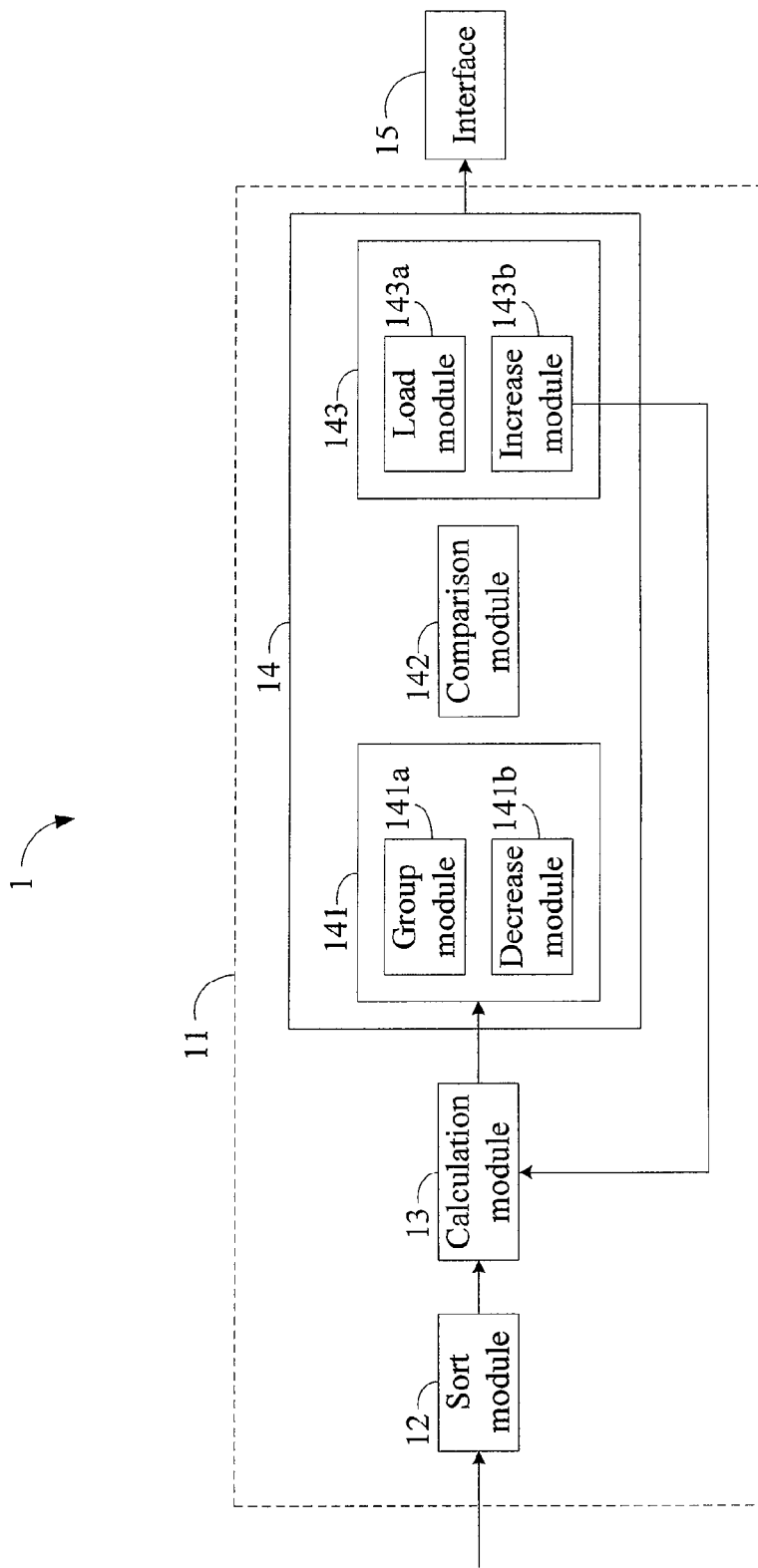
FIG. 1 illustrates a first embodiment of the present invention.

FIG. 1 illustrates a first embodiment of the present invention, which is a communication transmission system 1. The communication transmission system 1 comprises a processing unit 11 and an interface 15. The processing unit 11 comprises a sort module 12, a calculation module 13, and a decision module 14. The decision module 14 comprises a selection module 141, a comparison module 142, and a process module 143. The selection module 141 comprises a group module 141a and a decrease module 141b. The process module 143 comprises a load module 143a and an increase module 143b. Each of the modules can be realized by an apparatus that has processing or operating ability, such as a CPU.

In the first embodiment, the communication transmission system 1 comprises N sub-channels with a required data rate $B_{req}$. The communication transmission system 1 will assign $b_i$ bits to the $i^{th}$ sub-channel so that $$\sum_{i=1}^{N} b_i = B_{req} \text{ and } \sum_{i=1}^{N} P_i$$

is minimized, wherein $b_i \in \{0, 1, \ldots, \bar{b}\}$, $\forall 1 \leq i \leq N$, $\bar{b}$ is the maximum of the number of bits that can be assigned to each of the N sub-channels, and $P_i$ is the consumed power of the $i^{th}$ sub-channel. Generally speaking, the first embodiment comprises two stages. The first stage is the loading stage, while the second stage is the removing stage.

First, the loading stage is performed. The processing unit 11 is configured to load a predetermined number of bits, i.e. $B_{req}$ bits, into the N sub-channels to achieve the required data rate $B_{req}$. The sort module 12 sorts the N sub-channels into N sorted sub-channels according to a channel gain to noise ratio (CNR) of each of the sub-channels. It is noted that the CNRs can be replaced by other values that represent the qualities of the sub-channels in other embodiments. After sorting, the relations of the CNRs can be represented as $CNR_1 \geq \ldots \geq CNR_N$, wherein the subscripts indicate the order of the sorted sub-channels. That is, $CNR_1$ indicates the CNR of the first sorted sub-channel.

Then, the calculation module 13 calculates a difference value $d_i$ for each of the sorted sub-channels, except for the first sorted sub-channel, according to the corresponding $CNR_i$. To be more specific, $$d_i = \left\lfloor \log_2\left(\frac{CNR_1}{CNR_i}\right) \right\rfloor,$$

wherein i denotes the index of the $i^{th}$ sorted sub-channel and $d_i$ denotes the difference value between the $i^{th}$ sorted sub-channel and the first sorted sub-channel. In this embodiment, the difference values $d_i$ indicate the difference value of the number of bits assigned to the first sorted sub-channel and the number of bits assigned to the $i^{th}$ sorted sub-channel.

Figure 2A:
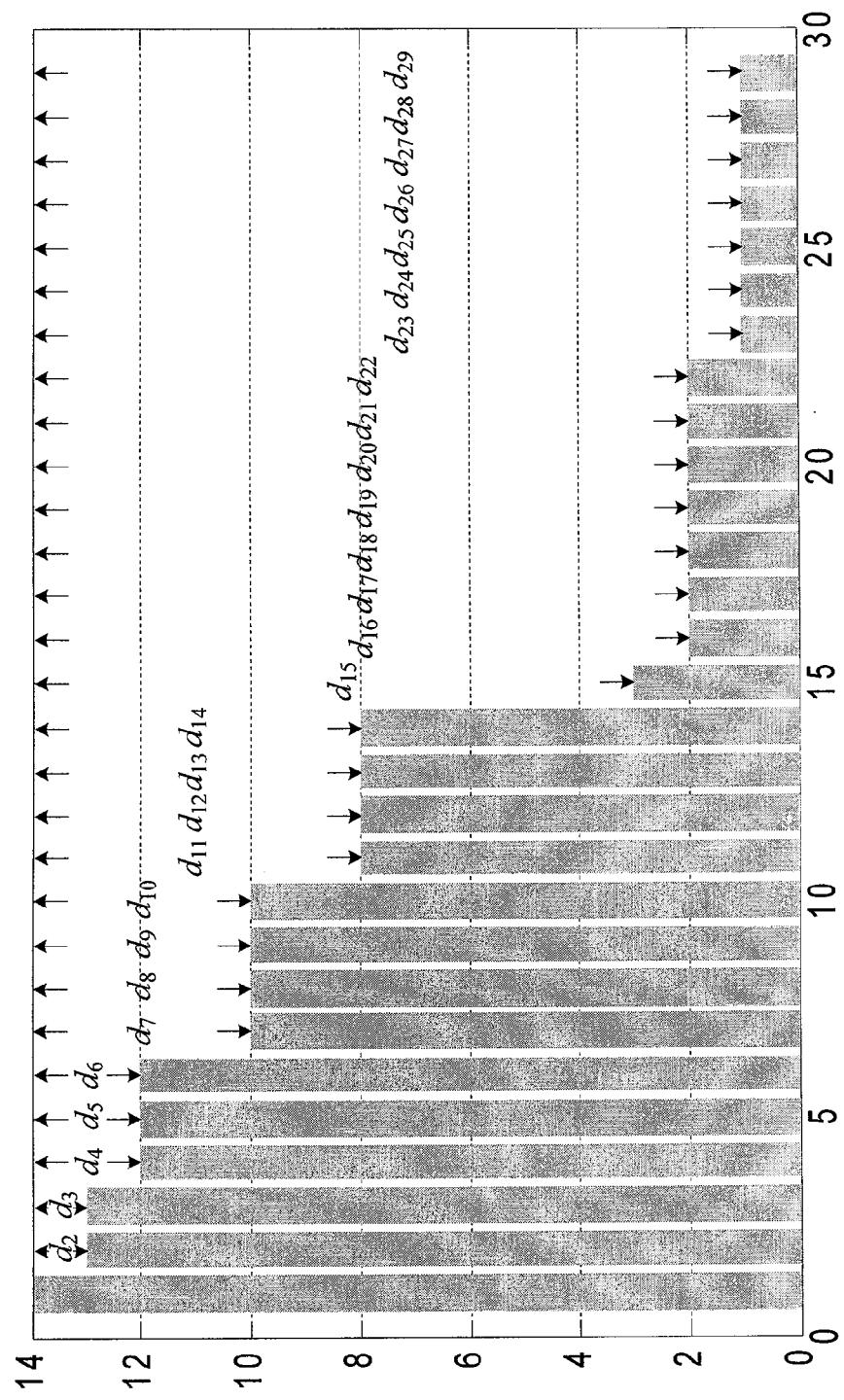
FIG. 2A illustrates the difference values of the sorted sub-channels of the first embodiments.

To be more concrete, it is assumed that the parameters are set to N=29, $B_{req}$=58, and $\bar{b}$=6. Based on the corresponding CNRs, $d_2$=1, $d_3$=1, $d_4$=2, $d_5$=2, $d_6$=2, $d_7$=4, $d_8$=4, $d_9$=4, $d_{10}$=4, $d_{11}$=6, $d_{12}$=6, $d_{13}$=6, $d_{14}$=6, $d_{15}$=11, $d_{16}$=12, $d_{17}$=12, $d_{18}$=12, $d_{19}$=12, $d_{20}$=12, $d_{21}$=12, $d_{22}$=12, $d_{23}$=13, $d_{24}$=13, $d_{25}$=13, $d_{26}$=13, $d_{27}$=13, $d_{28}$=13, and $d_{29}$=13 are derived. FIG. 2A visualizes the difference values by setting the number of bits assigned to the sub-channel with the lowest CNR as one. In FIG. 2A, the horizontal axis represents the index of the sorted sub-channels, while the vertical axis represents the number of bits. From FIG. 2A, if the sub-channel with the lowest CNR, i.e. the $29^{th}$ sorted sub-channel, has one bit, then the first sorted sub-channel has 14 (13+1) bits because $d_{29}$=13. FIG. 2A is used to demonstrate the difference values but not the loading result of the first embodiment.

The decision module 14 then utilizes several modules to decide a number of bits $b_i$ for each of the sorted sub-channels according to the difference value $d_i$, wherein a summation of the numbers is equal to the predetermined number. The details of the process to determine the number of bits, $b_i$, are explained in the following paragraphs.

The decision module 14 decides a temporary number $t_1$ of "1" for the first sorted sub-channel. In other embodiments, the temporary number $t_1$ may be set to other values depending on the particular situation. Then, the calculation module 13 calculates a calculated number $c_i$ for each of the rest sorted sub-channels by subtracting the corresponding difference value from the number of bits of the first sorted sub-channel, that is, calculating $c_i = t_1 - d_i$. The calculated values $c_i$ are derived as follows: $c_2$=0, $c_3$=0, $c_4$=−1, $c_5$=−1, $c_6$=−1, $c_7$=−3, $c_8$=−3, $c_9$=−3, $c_{10}$=−3, $c_{11}$=−5, $c_{12}$=−5, $c_{13}$=−5, $c_{14}$=−5, $c_{15}$=−10, $c_{16}$=−11, $c_{17}$=−11, $c_{18}$=−11, $c_{19}$=−11, $c_{20}$=−11, $c_{21}$=−11, $c_{22}$=−11, $c_{23}$=−12, $c_{24}$=−12, $c_{25}$=−12, $c_{26}$=−12, $c_{27}$=−12, $c_{28}$=−12, and $c_{29}$=−12.

Then, the selection module 141 selects a temporary number $t_i$ for each of the rest sorted sub-channels by selecting a maximum of a zero and a calculated number $c_i = t_1 - d_i$ for each of the sorted sub-channels, i.e. $t_i = \max\{0, c_i\} = \max\{0, t_1 - d_i\}$. All the $t_i$ values for the rest sorted sub-channels are equal to zero at this moment. After that, the selection module 141 selects the minimum of the temporary number $t_i$ and a reference value, i.e. $\bar{b}$=6 as the number of bits $b_i$ for each of the sorted sub-channels, i.e. $b_i = \min\{t_i, \bar{b}\}$. At this moment, $b_1$=1, while the other $b_i$ values are all 0.

Next, the calculation module 13 calculates the summation of the numbers of bits of the sorted sub-channels, i.e.

$$B = \sum_{i=1}^{N} b_i = \sum_{i=1}^{29} b_i,$$

which is 1 because $b_1$=1 and the rest $b_i$ values are zero. The comparison module 142 compares the summation B with the predetermined number $B_{req}$=58. The process module 143 processes the number of bits $b_i$ of each sub-channels according to the compared result. In other words, the operation is correlated with the result of whether the summation is smaller than, greater than, or equal to $B_{req}$.

At this moment, the summation B, i.e. 1, is smaller than the predetermined number $B_{req}$, i.e. 58. The increase module 143b increases the temporary number of the first sorted sub-channel $t_1$ by one, resulting in $t_1=2$. In response to the increase of $t_1$, the calculation module 13 repeatedly calculates the calculated number $c_i=t_1-d_i$ for each of the rest sorted sub-channels, while the selection module 141 repeatedly selects $t_i=\max\{0,c_i\}$ for each of the rest sorted sub-channel. The selection module 141 further repeatedly selects $b_i=\min\{t_1,\bar{b}\}$ for each of the sorted sub-channels, while the calculation module 13 repeatedly calculates the summation $$B = \sum_{i=1}^{N} b_i = \sum_{i=1}^{29} b_i.$$

Then, the comparison module 142 repeatedly compares the summation with the predetermined number $B_{req}$, so that the process module 143 can repeatedly process the number of bits of each of the sub-channels according to the compared result. The aforementioned operations will be repeated until the summation B is not smaller than the predetermined number $B_{req}$.

Figure 2B:
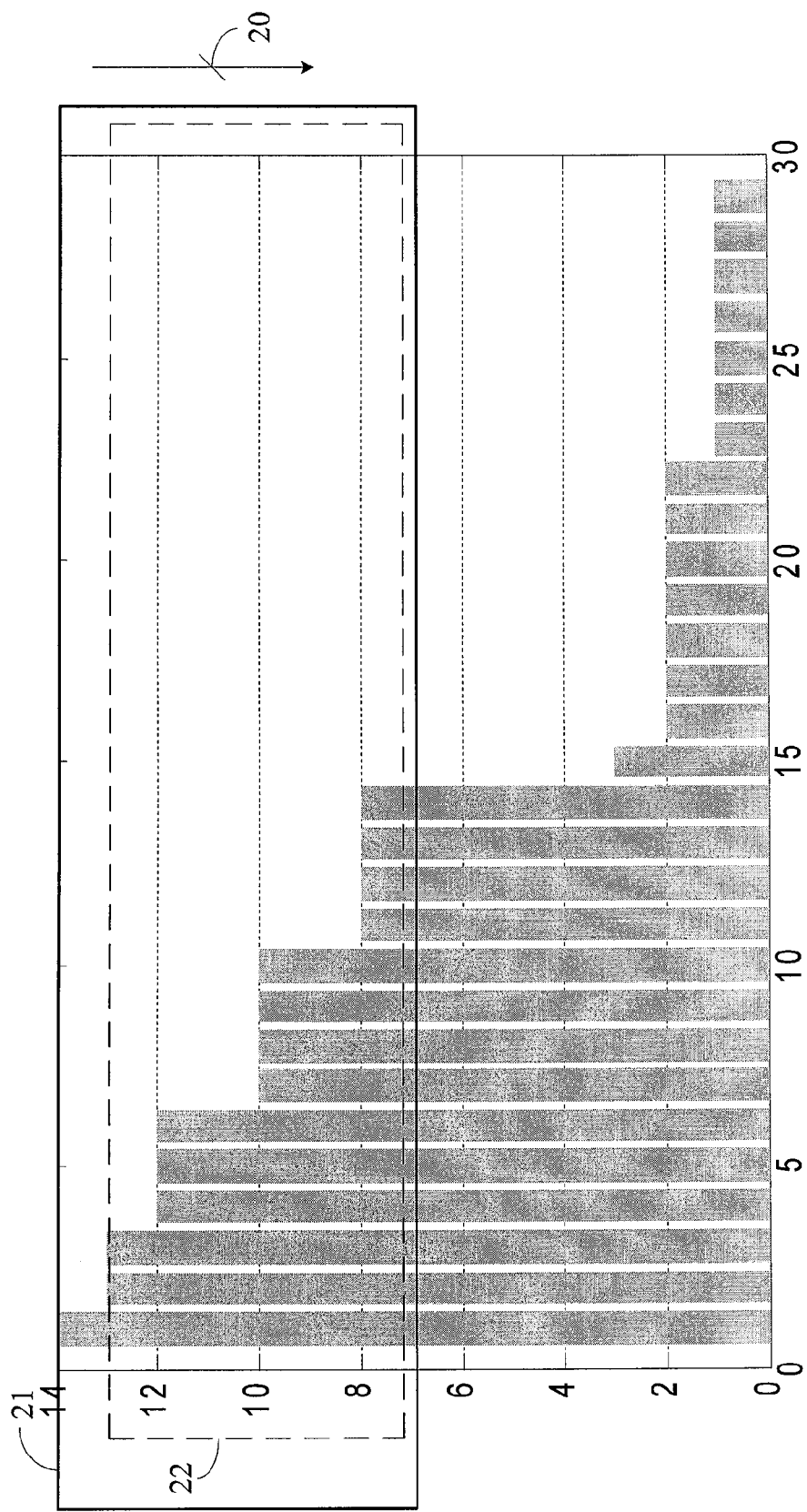
FIG. 2B illustrates an example of the temporary number and the number of bits of each of the sorted sub-channels.

Assuming that the temporary number of the first sorted sub-channel has been increased to 7, i.e. $t_1=7$, the aforementioned operations are visualized in FIG. 2B with $t_1=7$. In FIG. 2B, the horizontal axis represents the sorted sub-channels, while the vertical axis represents the number of bits. Although the vertical bars indicate the number of bits, they do not indicate the number of bits that are assigned to the sorted sub-channels. Instead, the portions of the vertical bars bound in the rectangle 22 represent the number of bits $b_i$ assigned to the sorted sub-channels. The summation of the number of bits comprised in the rectangle 22 is the summation B, which equals 49 at this moment. Meanwhile, the bits comprised in the rectangle 21 represent $t_i$. Since the summation of the bits is smaller than the predetermined number $B_{req}=58$, the rectangles 21, 22 continue moving downward as indicated by the arrow 20, i.e. increasing $t_i$.

Figure 2C:
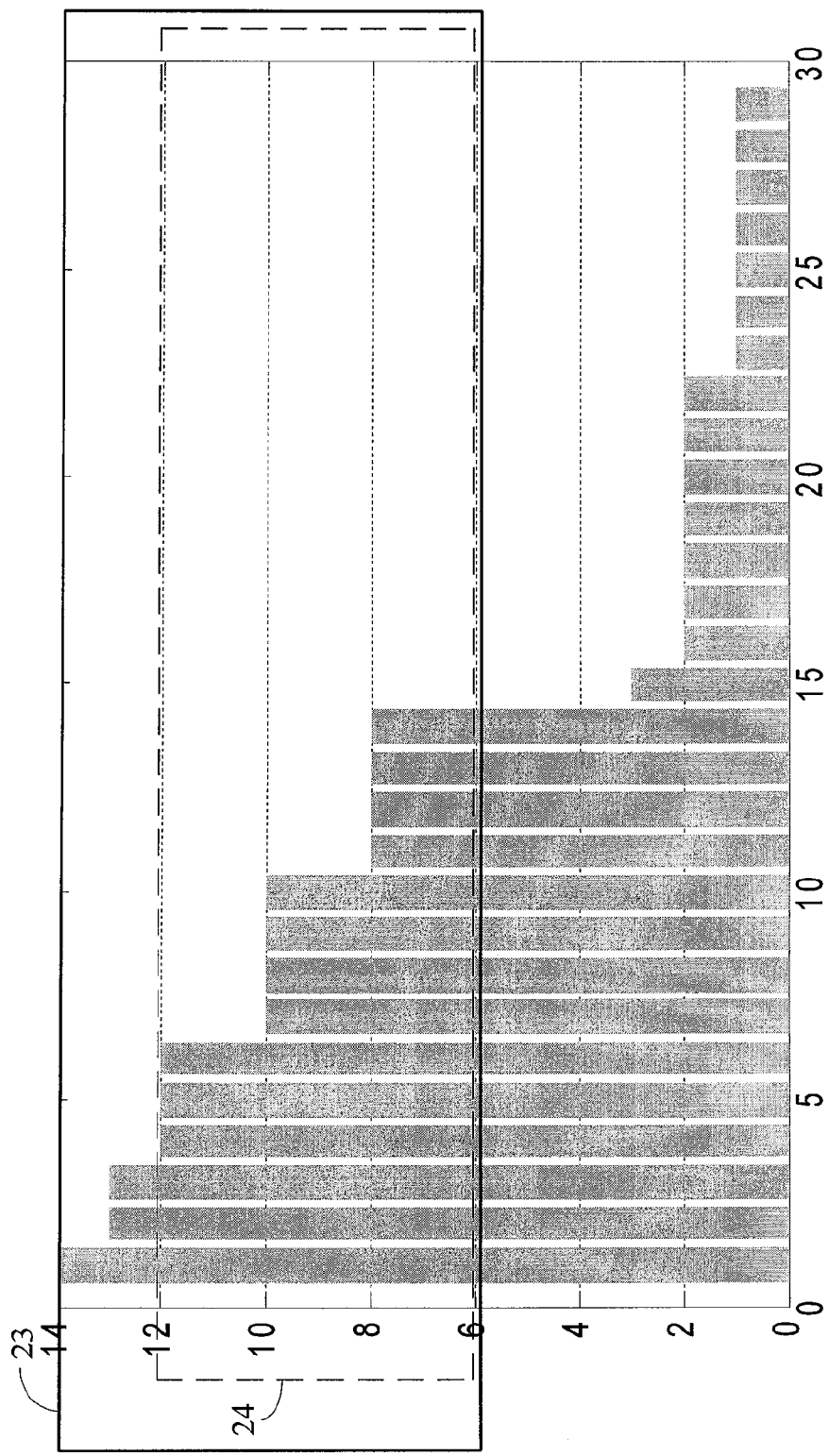
FIG. 2C illustrates another example of the temporary number and the number of bits of each of the sorted sub-channels.

Next, the increase module 143b increases $t_1$ to 8. Then, the calculation module 13 derives $c_2=7$, $c_3=7$, $c_4=6$, $c_5=6$, $c_6=6$, $c_7=4$, $c_8=4$, $c_9=4$, $c_{10}=4$, $c_{11}=2$, $c_{12}=2$, $c_{13}=2$, $c_{14}=2$, $c_{15}=-3$, $c_{16}=-4$, $c_{17}=-4$, $c_{18}=-4$, $c_{19}=-4$, $c_{20}=-4$, $c_{21}=-4$, $c_{22}=-4$, $c_{23}=-5$, $c_{24}=-5$, $c_{25}=-5$, $c_{26}=-5$, $c_{27}=-5$, $c_{28}=-5$, and $c_{29}=-5$, the selection module 141 derives $t_2=7$, $t_3=7$, $t_4=6$, $t_5=6$, $t_6=6$, $t_7=4$, $t_8=4$, $t_9=4$, $t_{10}=4$, $t_{11}=2$, $t_{12}=2$, $t_{13}=2$, $t_{14}=2$, $t_{15}=0$, $t_{16}=0$, $t_{17}=0$, $t_{18}=0$, $t_{19}=0$, $t_{20}=0$, $t_{21}=0$, $t_{22}=0$, $t_{23}=0$, $t_{24}=0$, $t_{25}=0$, $t_{26}=0$, $t_{27}=0$, $t_{28}=0$, and $t_{29}=0$, and the selection module 141 derives $b_1=6$, $b_2=6$, $b_3=6$, $b_4=6$, $b_5=6$, $b_6=6$, $b_7=4$, $b_8=4$, $b_9=4$, $b_{10}=4$, $b_{11}=2$, $b_{12}=2$, $b_{13}=2$, $b_{14}=2$, $b_{15}=0$, $b_{16}=0$, $b_{17}=0$, $b_{18}=0$, $b_{19}=0$, $b_{20}=0$, $b_{21}=0$, $b_{22}=0$, $b_{23}=0$, $b_{24}=0$, $b_{25}=0$, $b_{26}=0$, $b_{27}=0$, $b_{28}=0$, and $b_{29}=0$ in sequence. Then, the calculation module 13 calculates the summation, which equals 60. The comparison module 142 compares the summation $B=60$ with the predetermined number $B_{req}=58$. FIG. 2C illustrates the corresponding information when $t_1=8$. The bits comprised in the rectangle 23 represent $t_i$, while the bits comprised in the rectangle 24 represent the number of bits $b_i$ assigned to the sorted sub-channels.

Since the summation B is greater than the predetermined number $B_{req}$, the process module 143 processes an alternative approach. That is, the first embodiment enters the second stage, i.e. removing stage. First, the group module 141a groups the sub-channels with the same number of bits $b_i$ into a plurality of groups. To be more specific, the group module 141a groups $S_1$, $S_2$, $S_3$, $S_4$, $S_5$, and $S_6$ into a group $G_1$, groups $S_7$, $S_8$, $S_9$, and $S_{10}$ into a group $G_2$, and groups $S_{11}$, $S_{12}$, $S_{13}$, and $S_{14}$ into a group $G_3$. Then, the selection module 141 selects the sub-channel with the smallest CNR from each of the groups to derive the candidates. That is, the selection module 141 selects $S_6$ from group $G_1$, $S_{10}$ from group $G_2$, and $S_{14}$ from group $G_3$ as the candidates. The calculation module 13 then calculates a power reduction value for each of the candidates using the following equation:

$$\Delta P_j^- = \frac{\Gamma}{CNR_j} 2^{b_j - 1},$$

wherein j indicates the index of the candidates and $$\Gamma = \frac{1}{1.6} \ln\left(\frac{0.2}{BER}\right)$$

is constant under the bit error rate (BER) constraint. The decrease module 141b decreases the number of bits of the candidates with the greatest power reduction value by one. Assuming that the candidate with the greatest power reduction value is $S_6$, the number of bits of $S_6$ is decreased to 5 with the decrease module 141b. Then, the calculation module 13 calculates the summation, B, of the number of bits of the sorted sub-channels again and derives $B=59$. The comparison module 142 compares the summation with the predetermined number again so that the process module 143 can process the number of bits of each sub-channel according to the compared result.

Because the summation, 59, is still greater than the predetermined number 58, the selection module 141 repeatedly selects the sub-channel with the smallest quality value from each of the groups to derive the candidate again, i.e. selecting $S_5$ from group $G_1$, $S_{10}$ from group $G_2$, and $S_{14}$ from group $G_3$. The calculation module 13 then repeatedly calculates the power reduction value for each of the candidates again. Likewise, the decrease module 141b repeatedly decreases the number of bits of the candidate with the greatest power reduction by one. This time, the decrease module 141b decreases the number of bits of $S_5$ to 5. Then, the calculation module 13 calculates the summation of the number of bits of the sorted sub-channels, which equals 58. The comparison module 142 compares the summation with the predetermined number again so the process 143 module can process the number of bits of each of the sub-channels according to the compared result.

Now, because the compared result of summation B is equal to the predetermined number $B_{req}$, the load module 143a loads the numbers of bits, $b_1=6$, $b_2=6$, $b_3=6$, $b_4=6$, $b_5=5$, $b_6=5$, $b_7=4$, $b_8=4$, $b_9=4$, $b_{10}=4$, $b_{11}=2$, $b_{12}=2$, $b_{13}=2$, $b_{14}=2$, $b_{15}=0$, $b_{16}=0$, $b_{17}=0$, $b_{18}=0$, $b_{19}=0$, $b_{20}=0$, $b_{21}=0$, $b_{22}=0$, $b_{23}=0$, $b_{24}=0$, $b_{25}=0$, $b_{26}=0$, $b_{27}=0$, $b_{28}=0$, and $b_{29}=0$, into the corresponding sub-channels. Then, the interface 15 transmits the predetermined number of bits.

Since the difference values are calculated at the very beginning in the loading stage, the bits allocated to all the sorted sub-channels are simply updated according to the difference values. This updating approach in the loading stage has two significant indications. The first indication is that all the sorted sub-channels are updated together, while the second indication is that the updating is achieved by simple calculations. After several iterations, when the summation of the numbers of bits is not smaller than the predetermined number (i.e. the required data rate $B_{req}$), the loading stage finishes. At this moment, the number of bits $b_i$ assigned to each of the sub-channels is equal to or is one-bit greater than the number derived by the optimal methods (bit-loading method and bit-removal method of the prior art). Although the removal stage requires the calculation of the power reduction values for each of the candidates, it is still efficient because the candidate sizes are extremely small. The present invention requires N+1 logarithmic operations, N exponential operations, and 2N+3 multiplications. Consequently, the present invention is able to load the predetermined number of bits $B_{req}$ into the N sub-channels.

Figure 3A:
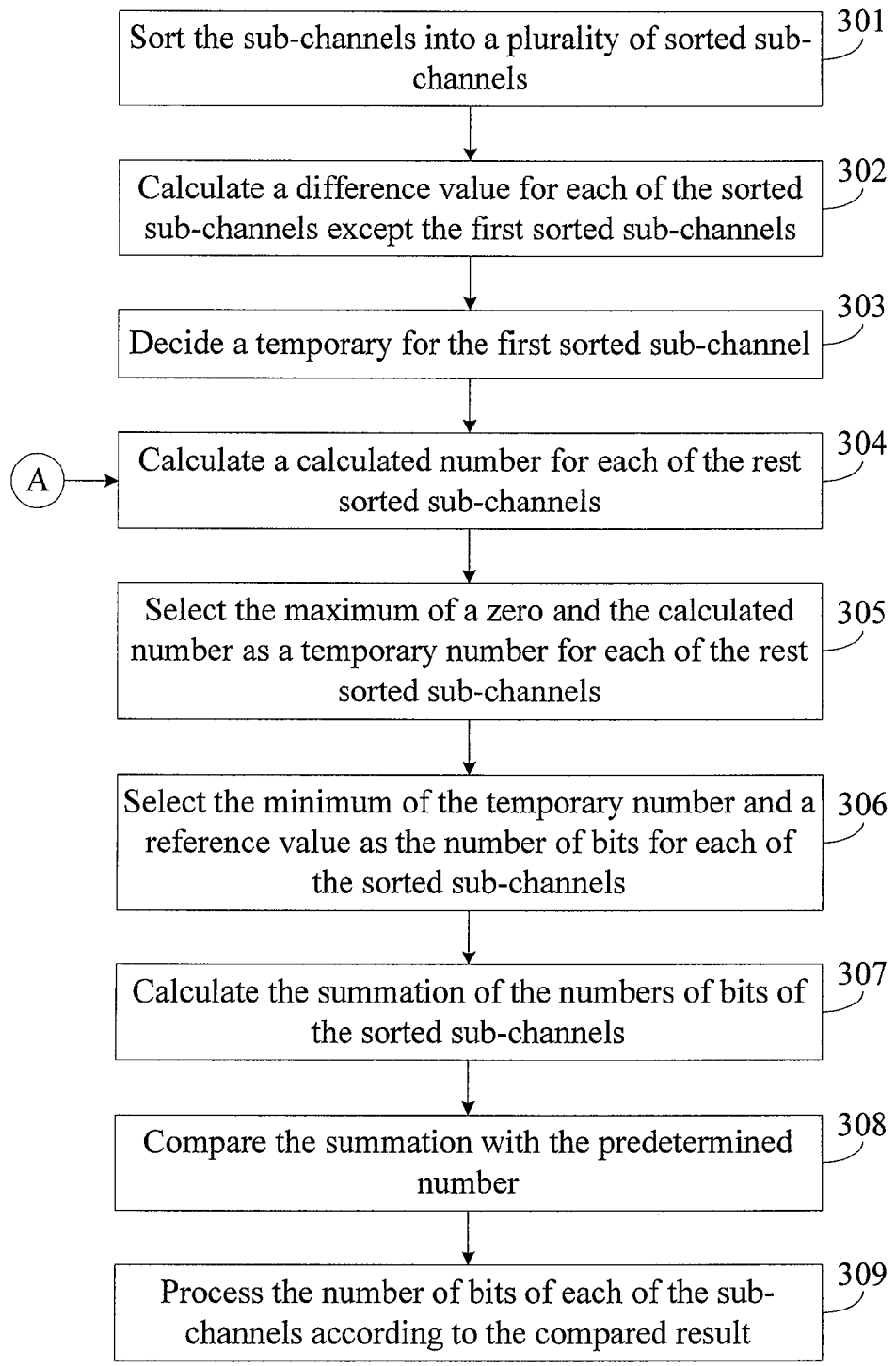
FIG. 3A illustrates the second embodiment of the present invention.

FIG. 3A illustrates the flowchart of the second embodiment of the present invention, which is a method for loading a predetermined number of bits into a plurality of sub-channels. First, the method executes step 301 to sort the sub-channels into a plurality of sorted sub-channels according to a quality value of each of the sub-channels. Then, step 302 is executed to calculate a difference value for each of the sorted sub-channels, except for the first sorted sub-channels, according to the corresponding quality values according to $$d_i = \left\lfloor \log_2\left(\frac{CNR_1}{CNR_i}\right) \right\rfloor,$$

wherein i denotes the index of the sub-channel, $CNR_i$ denotes the quality value of the $i^{th}$ sorted sub-channel, and $d_i$ denotes the difference value. Then, 303~319 are executed to decide a number of bits for each of the sorted sub-channels according to the difference values, wherein a summation of the numbers is equal to the predetermined number.

More specifically, step 303 decides a temporary number for the first sorted sub-channel. Next, step 304 calculates a calculated number for each of the rest sorted sub-channels by subtracting the corresponding difference value from the number of bits of the first sorted sub-channel. After that, step 305 selects a maximum value of zero and the calculated number as a temporary number for each of the rest sorted sub-channels. Then, step 306 selects a minimum of the temporary number and a reference value as the number of bits for each of the sorted sub-channels, wherein the reference value is the maximum number of bits that each of the sub-channel is adapted to carry. The method further executes step 307 to calculate the summation of the numbers of bits of the sorted sub-channels. Then, step 308 compares the summation with the predetermined number. Lastly, step 309 processes the number of bits of each of the sub-channels according to the compared result.

Figure 3B:
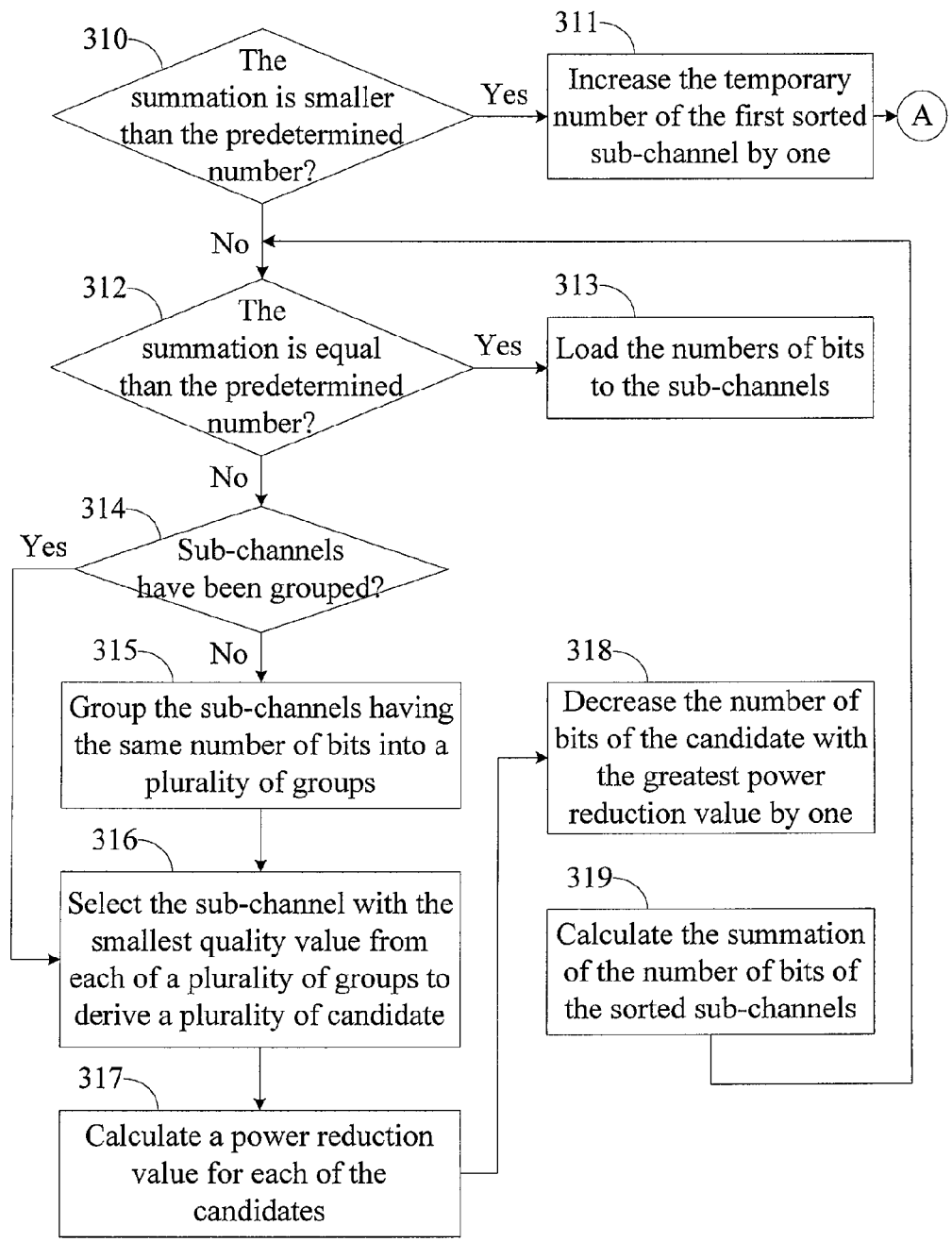
FIG. 3B illustrates the second embodiment of the present invention.

More specifically, step 309 comprises steps 310~319 as illustrated in FIG. 3B. First, step 310 determines whether the summation is smaller than the predetermined number. If so, step 311 increases the temporary number of the first sorted sub-channel by one. Then, the method proceeds to step 304. If the result of step 310 indicates the summation is not smaller than the predetermined number, step 312 determines whether the summation is equal to the predetermined number. If so, step 313 loads the numbers of bits into the sub-channels. If not, i.e. the summation is greater than the predetermined number, the method executes step 314 to determine whether the sub-channels have been grouped. If the sub-channels have not been grouped yet, the method executes step 315 to group the sub-channels with the same number of bits into a plurality of groups. Next, step 316 selects the sub-channel with the smallest quality value from each of the groups to derive a plurality of candidates. If the sub-channels have been grouped in step 314, the method directly proceeds to step 316. Next, the method proceeds to step 317 to calculate a power reduction value for each of the candidates. Step 318 decreases the number of bits of the candidate with the greatest power reduction value by one. Next, step 319 calculates the summation of the number of bits of the sorted sub-channels. Then, the method proceeds to step 312 again.

In addition to the steps illustrated in FIG. 3A and FIG. 3B, the second embodiment is able to execute all the operations and functions described in the first embodiment. Those skilled in the art can directly understand how the second embodiment can execute the operations and functions based on the aforementioned first embodiment. Consequently, redundant descriptions for the operations and functions are not repeated herein.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for loading a predetermined number of bits into a plurality of sub-channels, the method being executed by a processing unit of a communication transmission system, the method comprising the steps of:
   (a) enabling the processing unit to sort the sub-channels into a plurality of sorted sub-channels according to a quality value of each of the sub-channels;
   (b) enabling the processing unit to perform the following operation for each of the sorted sub-channels except the first sorted sub-channel: calculating a difference value by using the quality value of the sorted sub-channel and the quality value of the first sorted sub-channel; and
   (c) enabling the processing unit to decide a number of bits for each of the sorted sub-channels according to the difference values.

2. The method of claim 1, wherein the step (b) enables the processing unit to calculate the difference value according to the following equation:

$$d_i = \left\lfloor \log_2\left(\frac{CNR_1}{CNR_i}\right) \right\rfloor,$$

wherein i denotes the index of the sub-channels, CNR denotes the quality value, and $d_i$ denotes the difference value.

3. The method of claim 1, wherein the step (c) comprises the steps of:
   (d) enabling the processing unit to decide a temporary number for the first sorted sub-channel;
   (e) enabling the processing unit to calculate a calculated number for each of the rest sorted sub-channels by subtracting the corresponding difference value from the number of bits of the first sorted sub-channel;
   (f) enabling the processing unit to select the maximum of a zero and the calculated number as a temporary number for each of the rest sorted sub-channels; and
   (g) enabling the processing unit to select the minimum of the temporary number and a reference value as the number of bits for each of the sorted sub-channels, the reference value being the maximal number of bits that each of the sub-channel is adapted to carry;
   (h) enabling the processing unit to calculate a summation of the numbers of bits of the sorted sub-channels;

(i) enabling the processing unit to compare a summation with the predetermined number; and (j) enabling the processing unit to process the number of bits of each of the sub-channels according to the compared result.

4. The method of claim 3, wherein the step (j) comprises the step of:

enabling the processing unit to load the numbers of bits into the sub-channels, if the summation is equal to the predetermined number.

5. The method of claim 3, wherein the step (j) comprises the steps of:

enabling the processing unit to increase the temporary number of the first sorted sub-channel by one, if the summation is smaller than the predetermined number; and enabling the processing unit to repeat the step (e), step (f), step (g), step (h), step (i), and step (j) in sequence.

6. The method of claim 3, wherein the step (j) comprises the steps of:

(k) enabling the processing unit to group the sub-channels having the same number of bits into a plurality of groups, if the summation is greater than the predetermined number;

(l) enabling the processing unit to select the sub-channel with the smallest quality value from each of a plurality of groups to derive a plurality of candidate;

(m) enabling the processing unit to calculate a power reduction value for each of the candidates;

(n) enabling the processing unit to decrease the number of bits of the candidate with the greatest power reduction value by one;

(o) enabling the processing unit to calculate the summation of the number of bits of the sorted sub-channels in response to the step (n);

(p) enabling the processing unit to compare the summation with the predetermined number; and (q) enabling the processing unit to process the number of bits of each of the sub-channels according to the compared result.

7. The method of claim 6, wherein the step (q) comprises the step of:

enabling the processing unit to repeat the step (I), step (m), step (n), step (o), step (p), and step (q) in sequence, if the summation is greater than the predetermined number.

8. The method of claim 6, wherein the step (q) comprises the step of:

enabling the processing unit to load the numbers of bits into the sub-channels, if the summation is equal to the predetermined number.

9. The method of claim 1, wherein the quality value is a channel gain to noise ratio (CNR).

10. An apparatus for loading a predetermined number of bits into a plurality of sub-channels, comprising:

a sort module for sorting the sub-channels into a plurality of sorted sub-channels according to a quality value of each of the sub-channels;

a calculation module for performing the following operation for each of the sorted sub-channels except the first sorted sub-channel: calculating a difference value by using the quality value of the sorted sub-channel and the quality value of the first sorted sub-channel; and a decision module for deciding a number of bits for each of the sorted sub-channels according to the difference values.

11. The apparatus of claim 10, wherein the calculation module calculates the difference value according to the following equation:

$$d_i = \left\lfloor \log_2\left(\frac{CNR_1}{CNR_i}\right) \right\rfloor,$$

wherein i denotes the index of the sub-channels, CNR denotes the quality value, and $d_i$ denotes the difference value.

12. The apparatus of claim 10, wherein the decision module comprises:

a selection module for selecting a temporary number for each of the sorted sub-channels except for the first sorted sub-channel by selecting the maximum of a zero and a calculated number of each of the sorted sub-channels and for selecting the minimum of the temporary number and a reference value as the number of bits for each of the sorted sub-channels, the reference value being the maximal number of bits that each of the sub-channel is adapted to carry;

a comparison module for comparing a summation of the number of bits with the predetermined number; and a process module for processing the number of bits of each of the sub-channels according to the compared result;

wherein the decision module further decides a temporary number for the first sorted sub-channel, the calculation module further calculates the calculated number for each of the rest sorted sub-channels by subtracting the corresponding difference value from the number of bits of the first sorted sub-channel, and the calculation module further calculates the summation of the numbers of bits of the sorted sub-channels.

13. The apparatus of claim 12, wherein the process module comprising:

a load module for loading the numbers of bits into the sub-channels, if the summation is equal to the predetermined number.

14. The apparatus of claim 12, wherein the process module comprising:

an increase module for increasing the temporary number of the first sorted sub-channel by one, if the summation is smaller than the predetermined number, wherein in response to the increase, the calculation module further repeatedly calculates the calculated number for each of the rest sorted sub-channels by subtracting the corresponding difference value from the number of bits of the first sorted sub-channel, the selection module further repeatedly selects the maximum of the zero and the calculated number as the temporary number for each of the rest sorted sub-channels, the selection module further repeatedly selects the minimum of the temporary number and the reference value as the number of bits for each of the rest sorted sub-channels, the calculation module further repeatedly calculates the summation of the numbers of bits of the sorted sub-channels, the comparison module further repeatedly compares the summation with the predetermined number, and the process module further repeatedly processes the number of bits of each of the sub-channels according to the compared result.

15. The apparatus of claim 12, wherein the selection module comprising:

a group module for grouping the sub-channels having the same number of bits into a plurality of groups, if the summation is greater than the predetermined number, and a decrease module for decreasing the number of bits of one of a plurality of candidates, the candidate being decreased having a greatest power reduction value;

wherein the selection module further selects the sub-channel with the smallest quality value from each of a plurality of groups to derive the candidates, the calculation module further calculates a power reduction value for each of the candidates, the calculation module further calculates the summation of the number of bits of the sorted sub-channels, the comparison module further compares the summation with the predetermined number, and the process module further processes the number of bits of each of the sub-channels according to the compared result.

16. The apparatus of claim 15, wherein if the summation is greater than the predetermined number, the selection module further repeatedly selects the sub-channel with the smallest quality value from each of the groups to derive the candidate, the calculation module further repeatedly calculates the power reduction value for each of the candidates, the decrease module further repeatedly decreases the number of bits of the candidate with the greatest power reduction by one, the calculation module further repeatedly calculates the summation of the number of bits of the sorted sub-channels, the comparison module further repeatedly compares the summation with the predetermined number, and the process module further repeatedly processes the number of bits of each of the sub-channels according to the compared result.

17. The apparatus of claim 15, wherein the process module comprises:

a load module for loading the numbers of bits into the sub-channels, if the summation is equal to the predetermined number.

18. The apparatus of claim 10, wherein the quality value is a channel gain to noise ratio (CNR).

19. An apparatus for loading a predetermined number of bits into a plurality of sub-channels, comprising:

means for sorting the sub-channels into a plurality of sorted sub-channels according to a quality value of each of the sub-channels;

means for performing the following operation for each of the sorted sub-channels except the first sorted sub-channel: calculating a difference value by using the quality value of the sorted sub-channel and the quality value of the first sorted sub-channel; and means for deciding a number of bits for each of the sorted sub-channels according to the difference values;

wherein a summation of the number of bits is equal to the predetermined number of bits.

20. A system, comprising:

a processing unit for loading a predetermined number of bits into a plurality of sub-channels, comprising;

a sort module for sorting the sub-channels into a plurality of sorted sub-channels according to a quality value of each of the sub-channels;

a calculation module for performing the following operation for each of the sorted sub-channels except the first sorted sub-channel: calculating a difference value by using the quality value of the sorted sub-channel and the quality value of the first sorted sub-channel; and a decision module for deciding a number of bits for each of the sorted sub-channels according to the difference values, wherein a summation of the number of bits is equal to the predetermined number of bits; and an interface for transmitting the predetermined number of bits.

* * * * *